United States Patent [19]

Ivey

[11] Patent Number: 5,976,299
[45] Date of Patent: Nov. 2, 1999

[54] METHOD FOR MAKING A NON-PEELABLE, STERILIZABLE BAG

[75] Inventor: Brian W. Ivey, Chicago, Ill.

[73] Assignee: Fisher Container Corporation, Evanston, Ill.

[21] Appl. No.: 08/885,641

[22] Filed: Jun. 30, 1997

[51] Int. Cl.⁶ .............................. B32B 31/00; B29D 9/00; B08B 5/00
[52] U.S. Cl. ....................... 156/270; 156/308.4; 156/290; 156/583.1; 156/510; 134/15; 134/21; 134/64 R; 134/122 R; 493/197; 493/202; 493/239; 493/267; 53/467
[58] Field of Search ..................................... 493/190, 197, 493/202, 203, 206, 209, 239, 267; 134/1, 15, 21, 64 R, 122 R; 53/452, 128.1, 416, 467, 477, 547, 167; 156/308.4, 311, 583.1, 269, 290, 292, 270, 324, 510, 516

[56] References Cited

U.S. PATENT DOCUMENTS

| | | | |
|---|---|---|---|
| 3,229,813 | 1/1966 | Crowe Jr. et al. | 206/63.2 |
| 3,410,395 | 11/1968 | Sellers | 206/63.2 |
| 3,420,710 | 1/1969 | Wollman | 420/1 |
| 3,503,497 | 3/1970 | Riely et al. | 206/63.2 |
| 3,604,616 | 9/1971 | Greif | 206/439 |
| 3,685,720 | 8/1972 | Brady | 206/439 |
| 3,768,725 | 10/1973 | Pilaro | 206/439 |
| 3,891,089 | 6/1975 | Goodwin et al. | 206/439 |
| 3,926,311 | 12/1975 | Laske | 206/439 |
| 3,930,580 | 1/1976 | Bazell et al. | 206/439 |
| 3,938,658 | 2/1976 | Rohde | 206/439 |
| 3,986,918 | 10/1976 | Berner | 156/497 |
| 3,995,739 | 12/1976 | Tasch et al. | 206/484 |
| 4,091,921 | 5/1978 | Lewis | 206/363 |
| 4,116,338 | 9/1978 | Weichselbaum | 206/610 |
| 4,121,714 | 10/1978 | Daly et al. | 206/363 |
| 4,160,852 | 7/1979 | Torterotot et al. | 428/192 |
| 4,194,622 | 3/1980 | Lewis | 206/363 |
| 4,203,520 | 5/1980 | Schuster | 206/439 |
| 4,367,816 | 1/1983 | Wilkes | 206/439 |
| 4,396,582 | 8/1983 | Kodera | 422/300 |
| 4,402,453 | 9/1983 | Regenstein, Jr. | 383/89 |
| 4,550,831 | 11/1985 | Whitford | 206/439 |
| 4,603,538 | 8/1986 | Shave | 53/425 |
| 4,660,721 | 4/1987 | Mykleby | 206/439 |
| 4,841,712 | 6/1989 | Roou | 53/412 |
| 4,874,090 | 10/1989 | Dyke | 206/439 |
| 4,936,456 | 6/1990 | Bell et al. | 206/439 |
| 5,178,277 | 1/1993 | Brown et al. | 206/439 |
| 5,217,772 | 6/1993 | Brown et al. | 428/40 |
| 5,222,813 | 6/1993 | Kopp et al. | 383/200 |
| 5,230,430 | 7/1993 | Kidder | 206/484.1 |
| 5,246,109 | 9/1993 | Markle et al. | 206/303 |
| 5,344,017 | 9/1994 | Wittrock | 206/459.1 |
| 5,390,792 | 2/1995 | Van Ness et al. | 206/439 |
| 5,418,022 | 5/1995 | Anderson et al. | 428/35.2 |
| 5,459,978 | 10/1995 | Weiss et al. | 53/425 |
| 5,536,356 | 7/1996 | Stuerzel | 156/514 |
| 5,662,576 | 9/1997 | Sprehe et al. | 493/195 |
| 5,735,609 | 4/1998 | Norton | 383/33 |

Primary Examiner—David A. Simmons
Assistant Examiner—Linda L Gray
Attorney, Agent, or Firm—Brinks Hofer Gilson & Lione

[57] ABSTRACT

A method for making a non-peelable, sterilizable receptacle having a low particulate count for receiving articles for storage in pharmaceutical intermediate processing. This method involves providing a continuous first web of polyolefin film, providing a continuous second porous web of spun-bonded polyolefin film. The webs are advanced through cleaning processes that include an anti-static device, an ultrasonic vibrating device and a vacuum device. The two clean webs are then brought together and passed into the heat sealing section. The webs are heated welded together by forming continuous seams on the webs to form an open pouch. The seams are made by applying opposing platens at a pressure between about 30 to about 40 psi to both the webs and a heat welding element at a temperature of about 330° to about 380° F. against only the first web. This causes the first web to melt into the pores of the second web. The seams are then cooled to produce a welded seam having a pull resistance of greater than five pounds per linear inch. The webs welded are then cut in between the seams to form the receptacle.

18 Claims, 3 Drawing Sheets

METHOD FOR MAKING A NON-PEELABLE, STERILIZABLE BAG

FIELD OF INVENTION

This invention is related to a method for making sterilizable bags for use in secondary and intermediate processing of pharmaceutical products. The invention is also related to non-peelable, sterilizable bags for use in secondary and intermediate processing of pharmaceutical products.

BACKGROUND OF THE INVENTION

Currently, there is a severe deficiency in the packaging used in clean room sterilizing facilities. There is an abundance of packaging materials that are sterilizable and used in the medical industry for sterile presentation of surgical instruments. However, this packaging is generally inadequate for use in clean room sterilizing facilities. Many pharmaceutical and sterilizer clean rooms are class 100 or better, yet the items they sterilize are put in packaging produced in non-clean room environments. These items include a variety of pharmaceutical glassware, plasticware, containment and closure of devices for drugs, such as vials, syringes, rubber stoppers, and the like.

Presently, the sterilizable bag of choice for use in pharmaceutical clean rooms is a paper/polyester structure. The problem with this structure is the use of paper, even low shedding versions, introduces large quantities of particles into the environment and is not suitable for clean room work surfaces. Clearly, products can be only as clean, or as particulate free, as a package they are put in.

This paper/polyester sterilizable bag has several needs for improvement. The paper sheds a great deal of fiber particles and is unsuitable for many clean applications. The paper to polyester seal may be very weak and unable to carry large loads without failure. The paper tears easily when wet from being sterilized in steam autoclaves. This causes sterile quality assurance issues. Moreover, the paper only allows the effective transfer of steam in a narrow temperature range making sterilization questionable in steam autoclaves that are not tightly controlled.

Another packaging structure available is a polypropylene bag with a small TYVEK® window. This bag has only a heat tack weld between the TYVEK and the polypropylene resulting in weak seams that may fail. Also, the small window requires a longer sterilization time, and there is an added risk of residual gas plumes when ethylene oxide (ETO) is used for sterilization.

Another structure for use in pharmaceutical clean rooms is a steel tray with a breather window that is usually made of spun bond polypropylene. Because of the small breather window, larger differential pressures are needed to drive either the gas or steam in and out of the package during sterilization cycles. Also, longer sterilization times and drying times are required. And, there is the added risk of residual gas plumes emanating from-the tray, which may be hazardous to employees. Moreover, the steel trays are expensive and not adaptable for use with a variety of articles.

Another structure that is commonly used for sterile presentation of surgical instruments is the TYVEK/polyester peelable pouch, also known as a "Chevron" pouch. This pouch has one whole side made of polyester or other polymer film and the opposing side made of TYVEK. This product also has several drawbacks in clean room applications. The seals between the TYVEK and polyester film are generally designed to be peelable. This means that the seals are weak and may fail when carrying a load, especially after being sterilized. Even during sterilization, the seals may "blow out" if excessive pressure differentials are used, which limits the efficiency and lengthens the time required for sterilization cycles. Also, when the seals are peeled apart, TYVEK particles are generated in proximity to products inside the pouch. Finally, these products are generally not manufactured in clean room conditions and thus, have high particulate counts.

As may be understood from the above description, gas pervious materials are combined in these structures and adapted for gas or steam sterilization of the products contained inside. Fibrous polymer webs, such as spun-bonded polyolefins, and in particular a type of polyethylene known as "TYVEK 1059B or TYVEK 1073B", available from DuPont, Wilmington, Del., are useful for gas and steam sterilization. Such spun-bonded polyolefins are pervious to sterilizing gases such as ethylene oxide, steam, or dry heat while being impervious to bacteria and other contaminants. TYVEK 1059B and TYVEK 1073B, in particular, both have a pore size less than about 0.22 microns, which is sufficiently small to be impervious to bacteria and other major contaminants, while large enough to allow the flow of sterilizing gas and steam.

Although TYVEK has many advantages for use in this application, there are many drawbacks to avoid that caused many manufacturers to develop complicated structures. One drawback is the difficulty to make strong seals between TYVEK and other films without tearing or compromising the integrity of the TYVEK to bacteria infiltration. In obtaining-a strong heat seal or heat weld with TYVEK, when it is put under heat and pressure, it compresses fast and causes a stress point or a weak point that results in a failed seal. Another problem arises when attempting to make a strong seal by heat welding TYVEK to other materials that are not compatible of TYVEK due to different chemical structures and different melting temperatures. One way to avoid such problems is to make bags that have inherently weak seals or peelable seals. Therefore, the use of peelable structures is very common in the industry. The TYVEK layer can be coated with an adhesive or another polymer film to create a light tack weld to the underlying layer. Even un-coated, the TYVEK will create a weak tack weld with incompatible underlying films. But in these cases, the weld is not as strong as a hermetic, heat weld seal that would be desirable for pharmaceutical intermediate processing.

In attempting to obtain a strong seal between TYVEK and the opposing polymer film, there are numerous problems to overcome. Traditionally, most heat sealing machines apply heat both to top and bottom of the plastic film in between to heat and melt both the top layer and bottom layer together. However, when TYVEK is one of the layers, there is a lot of problems with getting a good hermetic seal. In a microscopic view, TYVEK is not a smooth film. There is a lot of variation in its gauge. Although it's typically produced to an average of 6.6 mil thickness, there is a lot of variation in the thickness because it's spun-bonded. There are areas where it is only 4 mils thick and there are other areas that may be 10 mils thick. In trying to make a seal, a uniform pressure and temperature is applied across the TYVEK. The high points of the surface come in close contact with the heating element but the low points do not. Portions of the TYVEK are compressed, with some portions heavily crushed and other portions slightly crushed. Often, there are tears and rips in the TYVEK from the excessive sheer stress, pressures and heat. Also, there are often pin holes created due to these variations in thickness, tearing and melted TYVEK flowing away from stress points. These pin holes and tears compromise the sterilizable bag's ability to resist the infusion of bacteria and contaminants after it has been sterilized. Even the strongest of these prior art seals with TYVEK has a pull resistance less than about four pounds per linear inch. Placing a heavy load of articles in these bags can pull apart that seal. Likewise, subjecting the bags to even normal differential pressures of—14 inches Hg during the sterilization cycles can cause the bag to inflate and pull apart or tear the seals.

Another problem with TYVEK used with prior art bags is that when the bags are manufactured with a peelable seal, the TYVEK can shed particles when the seal is opened, causing TYVEK fibers to get inside the bag and onto the sterilized clean product and articles inside. One should avoid particles from getting inside vials that are supposed to contain drugs for injection into human bodies. Moreover, because TYVEK has peaks and valleys and is not a smooth surface, a lot of particles like to stick in the valleys so that TYVEK has associated with it a lot of unclean particles that can shake loose and contaminate the articles being stored inside bags made with TYVEK. Again, the typical solution for this is to put a layer of perforated plastic film between the TYVEK and the article inside the bag. This ultimately requires the manufacture of a more complicated structure. And even the film that is between the TYVEK and the contents may not be clean. A lot of polymer films that are used in these structures generate high static charges that can attract minute particles which are difficult to dislodge except when clean articles having opposite charges are placed inside the bag. Then, the dirty particles jump off the polymer films and right onto the articles placed in the bag.

Therefore, there is a need for a sterilizable bag for use in this pharmaceutical secondary processing market that is simple and has a large gas permeable area, yet is impervious to bacteria and other contaminants. The large area reduces the time of sterilization cycles, thereby reducing operating costs. This bag must also have a very low particulate count to keep the contaminants from being carried to the articles from the surface of the bag. Also, there is a need for these bags to have strong seals which can withstand high differential pressures in aggressive sterilization cycles, and contain large quantities of articles that may be placed in the bag and stored for long periods.

SUMMARY OF THE INVENTION

The invention provides a method for making a non-peelable, sterilizable receptacle having a low particulate count for receiving articles for storage in for use in pharmaceutical intermediate processing. This method involves providing a continuous first web of polyolefin film, providing a continuous second web of spun-bonded polyolefin film, wherein the second web is made from a compatible polyolefin material. The webs are advanced through cleaning processes that include an anti-static device, an ultrasonic vibrating device and a vacuum device. The two clean webs are then brought together and passed into the heat sealing section. Continuous seams on the web are heat welded to create an open pouch. The seams are made by applying opposing platens at a pressure between about 30 to about 40 psi and a heat welding element at a temperature of about 330° to about 380° F. against only the first web. The seams are then cooled to produce a welded seam having a pull resistance of greater than five pounds per linear inch. The web is then cut in between the seams to form an individual receptacle.

Another aspect of this invention is a non-peelable, sterilizable receptacle adapted for use in pharmaceutical intermediate processing. This receptacle, or sterilizable bag, ideally has a low particulate count and can store articles in sterilized conditions indefinitely. This pouch is made of a layer of high density polyolefin, and a second layer of chemically similar spun-bonded polyolefin having a similar melting point as the polyolefin film of the first layer. The first layer is heat welded to the second layer along a substantial portion of the perimeter to create an open pouch for receiving articles. The welded seams are non-peelable, having a pull resistance of greater than five pounds per linear inch. The receptacle is substantially clean having a particulate count of less than 60 particles greater than 25 microns per square foot of surface area.

The clean levels that this invention achieves addresses the primary quality assurance issues for application of the receptacle in a clean room environment. The receptacle has strong heat welded seams that resist tears and are, in fact, stronger than the gas permeable material that it is made from. Also, the gas permeable material surface area is maximized to-reduce demands on the sterilizing equipment by allowing shortened, standardized sterilization cycles.

DETAILED DESCRIPTION OF THE PREFERRED EMBODIMENTS

Figure 3:
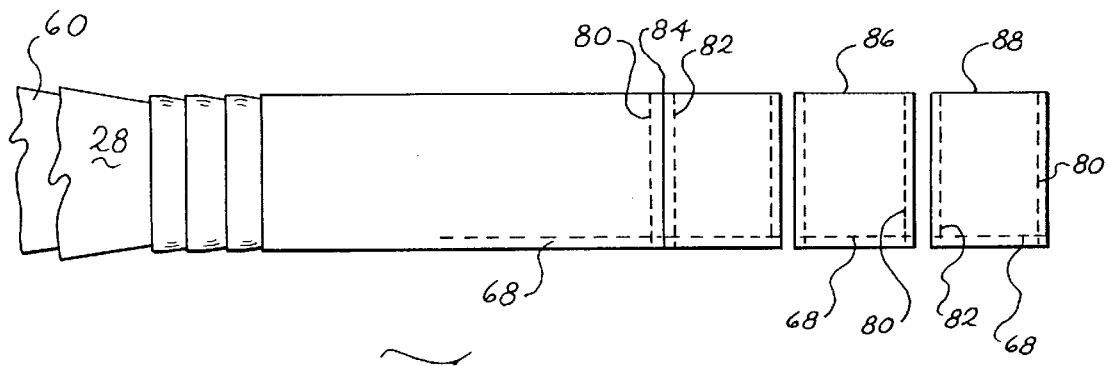
FIG. 3 is a top plan view of the webs passing through the heat sealing process of FIG. 2.

The invention is related to a sterilizable receptacle for articles used in intermediate processing by the pharmaceutical industry. In particular, the preferred embodiment of the receptacle is a bag, or pouch, that is made from a two-layer structure: one layer being TYVEK, and the other being high density polyethylene. The articles are contained between these two layers. As shown in FIG. 3, the bags 86 and 88 are formed consecutively in the heat sealing process. These bags have three super-strong heat welded seams, or seals, 68, 80 and 82 that form a pouch in the two layer structure. Though simple in concept, the bags are not simple in practice because of the inherent difficulties in using TYVEK for such an application and obtaining the strong seals without pinholes or tears in the TYVEK.

The selection of materials used to make the preferred embodiment of this invention is important. There are two webs used to make these bags. The first web is a spun-bond polyolefin, preferably medical-grade TYVEK 1059B, available from DuPont, which is an opaque fibrous spun-bonded polyolefin made from a grade of high density polyethylene resin. It is pervious to sterilizing gas, such as ethylene oxide ("ETO") or steam, but impervious to bacteria and other contaminants. TYVEK 1059B is an FDA approved material used for breathable pouches. TYVEK 1073B is an acceptable equivalent grade of polyethylene for the same use. The difference in materials is believed to be cost and variance in thickness.

The second continuous web is a polymer film made from similar polymer structure and chemical make-up as the first web. Thus, when the first web is a spun-bond polyolefin made from high density fibers, the second web would be high density polyethylene (HDPE) film. Preferably, the second web is a high molecular weight film (HMW-HDPE). When the first web is the TYVEK 1059B or 1 073B, it is preferred that the second web be PRECISION CLEAN™ HD. This brand of HDPE is commercially available from Fisher Container Corp., Evanston, Ill., USA. This HDPE film comes in a variety of gauges, but for use in this invention, it is preferred to use film that has a thickness of 3 mils. This HDPE film may be made from a high molecular weight resin, such as commercially available HD960 from Huntsman Packaging Corp., South Deerfield, Mass., USA, or ALATHON L5005 from Fina Oil and Chemical Co., Deer Park, Tex., USA. These resins have a desirable melt index and density that relates to the compatibility of the two webs used in this invention.

It is important that the first and second web have a high degree of compatibility to create strong seals. The melting point of the materials should be close. For example, polypropylene film and TYVEK cannot create a strong seal in accordance with the teachings of this invention because there is about 25° F. difference in melting point temperature of the two. Also, the melt flow characteristics of the second web should be matched with the type of gas permeable material used for the first web for these reasons and additional reasons explained below.

Accordingly, the method of this invention overcomes the problems in the prior art and in the use of spun-bond material that traps contaminants by first passing the raw materials through a cleaning process with a unique sequence of different cleaning units to obtain clean material with low particulate counts. Second, the materials are passed through a unique heat sealing process to create a bag that has very strong seals. This sealing process is able to obtain seal strengths two to three times stronger than peelable or tack-welded seals.

Cleaning Process

Figure 1:
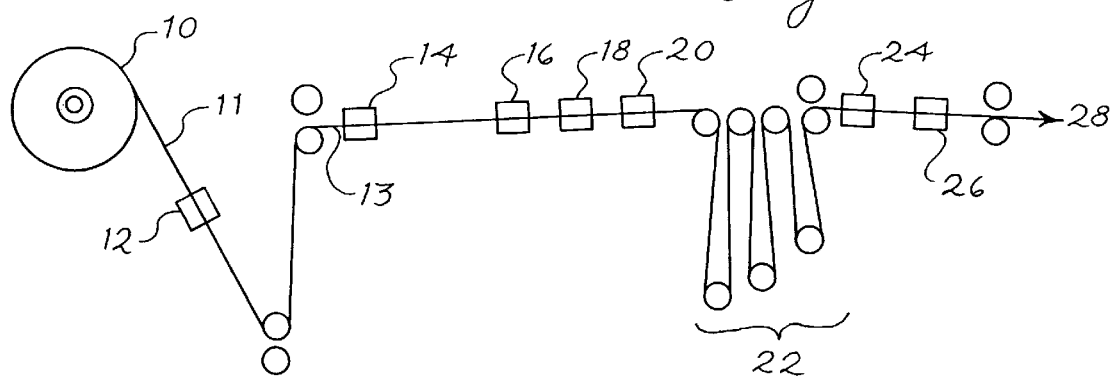
FIG. 1 is a lateral schematic view of the cleaning process of the present invention.

Referring to FIG. 1, there is shown in schematic detail the cleaning process of the preferred embodiment. This cleaning process is shown with a TYVEK web 10 being fed to the cleaning process. An identical cleaning process would be used for cleaning the high density polyethylene web (not shown). However, the particular units in the cleaning process do not need to be identically in operation. For example, if the TYVEK is dirtier, than you would use more of the cleaning units in order to achieve the required particulate count standard for the TYVEK.

In the preferred embodiment of the method of this invention, the continuous web of TYVEK 10 is mounted on an unwind stand with rolling bars for a continuous feeding. The unrolled TYVEK 11 passes to the first cleaning unit, which is an anti-static unit 12. The TYVEK web 13 then passes through some rollers and passes through an immersion unit 14. The immersion unit 14 is shown in more detail in FIG. 6. After the immersion unit, the web passes through a vacuum cleaning unit 16, an ultrasonic vibrator unit 18 and then another vacuum cleaning unit 20. A typical vacuum cleaning unit 16 is shown in more detail in FIG. 4. The web then passes through a series of tension controlled rollers 22 to take up slack in the web and permit continuous feed with minimal disruption. The web passes through another anti-static unit 24 and through a filtered high pressure blower unit 26. The high pressure blower unit 26 is shown in more detail in FIG. 5. After the cleaning process, the web continues to the heat sealing process 28.

The cleaning process is able to achieve low particulate counts on the finished products. For pharmaceutical intermediate processing, it is desirable to obtain a particulate count of less than about 60 particles of greater than 25 microns per square foot of surface area, with less than about 1 particles of greater than 50 microns per square foot of surface area. Preferably, the cleaning process may obtain a particulate count of less about 25 particles of greater than 25 microns per square foot of surface area, with less than about 0.5 particles of greater than 50 microns per square foot of surface area. More preferably, the cleaning process may obtain substantially no particles of greater than 50 microns per square foot of surface area.

To attain these low particulate counts, the entire cleaning and sealing processes should be carried out in a Class 100, or cleaner, cleanroom environment, to maintain a clean, nearly particle-free product. Preferably, the standard production environment is Class M2.5 (Federal Standard 209E), formerly known as Class 10 (Fed. Std. 209D). However, cleaner environments may be used depending on a customer's particular needs for ultimate use of the product. The manufacturing environment that this structure is produced in is important for the ability to meet needed cleanliness requirements. It is one of the unique attributes of this invention.

The webs used to manufacture this structure are cleaned to the degree necessary to meet customer specifications for acceptable particulate counts. The cleaning process involves static dissipation, static control, ultrasonic vibration, high pressure filtered air, high pressure vacuum and immersion. The technology for each one of these steps may or may not be used in any given production run depending on the desired particulate levels and the original condition of the raw materials used. To aid in understanding when these processes should be used, the following are the basic reasons for the use of each of these steps:

Static Control: In the production of polyolefins, friction generated static is common. In addition, all polyolefins have an electrostatic constant, or a natural ability to hold an electrostatic charge. Whether or not the polyolefin substrate will hold a charge up to this limit depends on many external factors, such as humidity, temperature, and friction. While a substrate has a charge, it is a natural attractor of particles in the area. It follows that one of the first things you want to do is dissipate this charge, if its exists. Several tools are used to eliminate this problem. First, many of the rollers in contact with the webs are metal that are completely grounded to allow electrostatic dissipation. Second, anti-static technology that encourages electrostatic dissipation is used through the entire production process. Such anti-static units are commercially available from SIMCO, Chicago, Ill., Model No. RA3342-D167RY. An additional benefit of this anti-static effort as a first unit in this embodiment of the cleaning process is reduction of the natural attraction of particles to the substrate before the other cleaning tools are used.

Figure 6:
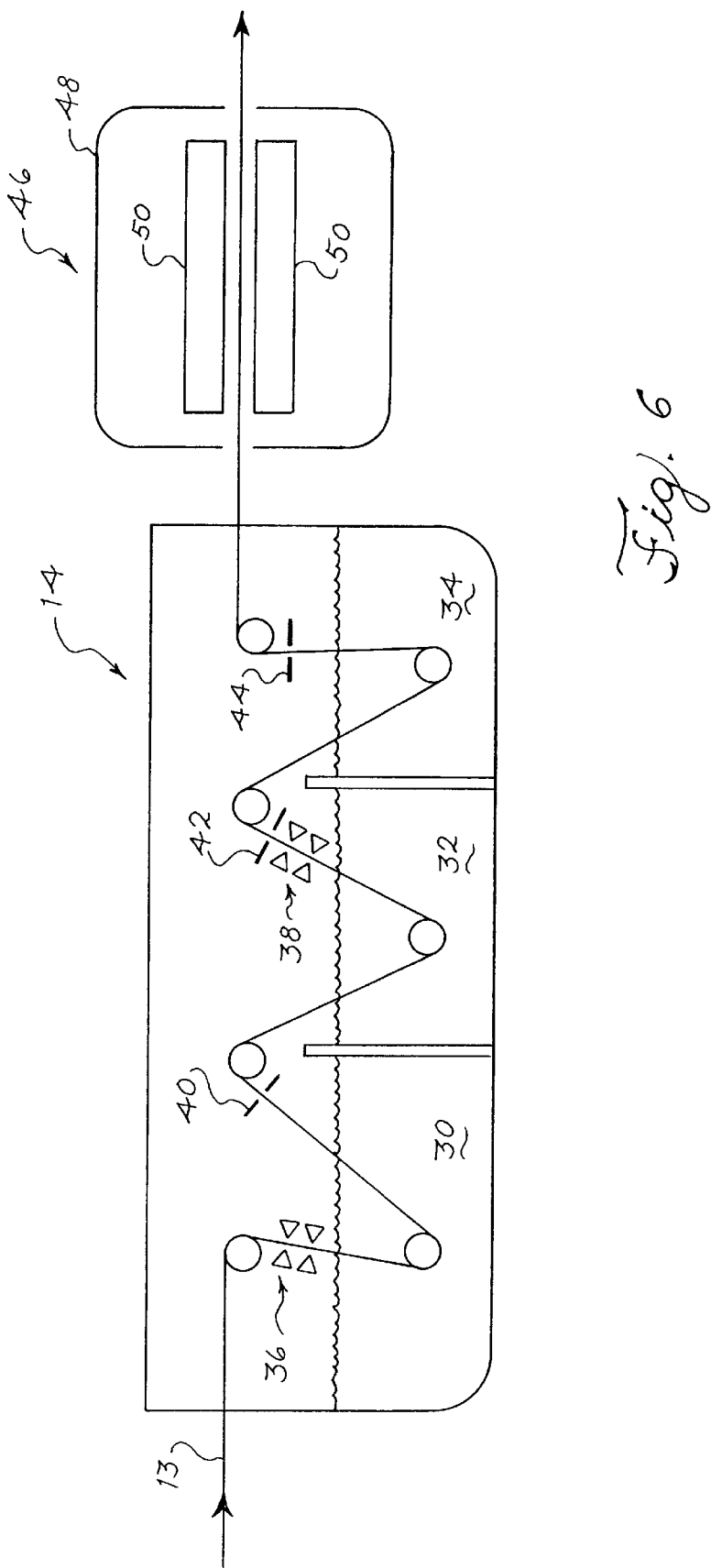
FIG. 6 is a cross-sectional lateral view of the immersion unit and air drying unit of the cleaning process.

Immersion: Preferably, the web is passed through an immersion unit 14. The web is immersed through a clean solution, such as soft water or alcohol, that is filtered and re-circulated constantly. However, alcohol would be less desirable than water because of residuals remaining on the material. Also, the residuals should be able to diffuse out of the final product due to the high breathability of the bag. As shown in FIG. 6, the web 13 is immersed several times in three baths 30, 32 and 34. Each bath has a filtered supply of water that is filtered and recycled about three times per minute. About 30 percent of the water is continuously purged and fresh filtered water is added as make-up to maintain the levels in the bath. Spray heads 36 and 38 are provided before and after immersion in the first and second baths. After immersion in each bath, the web goes through nips 40, 42 and 44 to squeegee off the liquid back into the bath. After the last bath 34, the web goes into a high pressure filtered heated air dryer unit 46 in an enclosure 48. Air distribution manifolds 50 direct heated air onto the top and bottom sides of the web. The temperature of the air will vary between about 150° F. and about 185° F., depending on the speed the web is traveling.

Sonic vibration: An ultrasonic vibrator 18 is used to loosen particles from the web substrate surface. The ultrasonic unit may be used prior to immersion, vacuuming, or high pressure air blowing. Frequencies and aggressiveness will vary under different conditions, such as, residual static and type of contamination on the webs. Such sonic units are commercially available from Web Systems, Boulder, Colo., Model "ULTRA".

Figure 5:
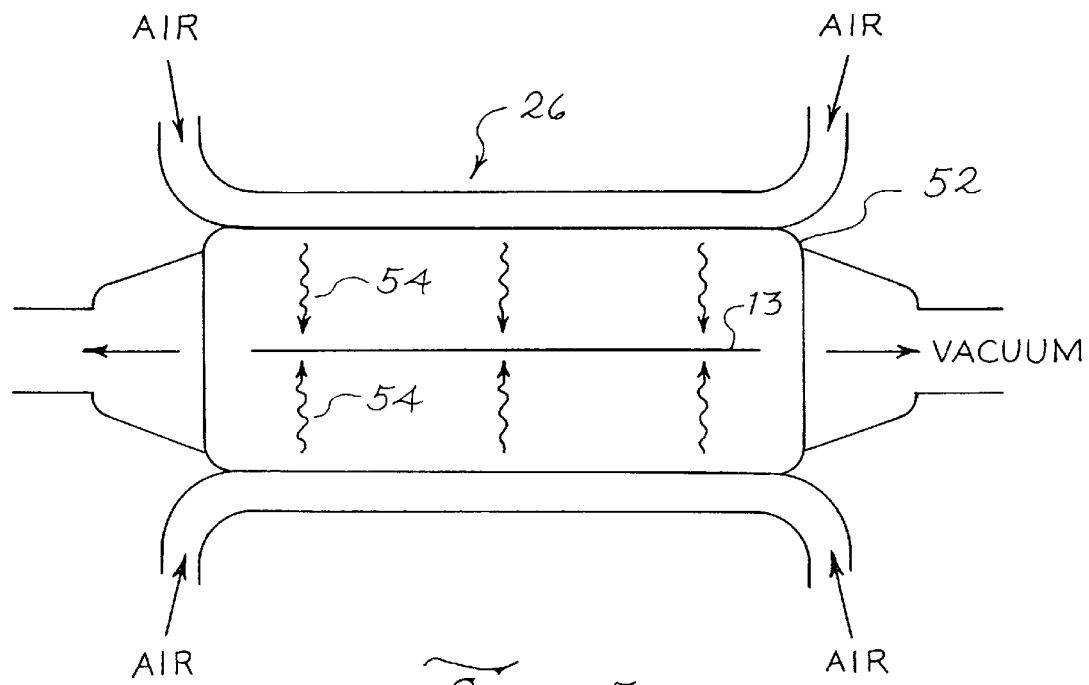
FIG. 5 is a cross-sectional longitudinal view of the air blower unit of the cleaning process.

High pressure air: A high pressure air unit 26 is used to blow the surface of the web to dislodge particles that a vacuum unit may miss. As shown in FIG. 5, high pressure air is applied in an enclosure 52 in concert with a vacuum draw. The air flow (arrow 54) is designed to dislodge particles and move them away from the web 13. The enclosure is necessary for the environment integrity of the clean room. Without the enclosure 52, particles would be blown all over the clean room environment, and possibly contaminate cleaned portions on the unwound web 10. Such high pressure air units are commercially available from Web Systems, Boulder, Colo., Model "Regenerative Blower." The air intake is passed through HEPA filters to filter out particles greater than 2 microns to avoid bringing additional particulates onto material that is being cleaned.

Figure 4:
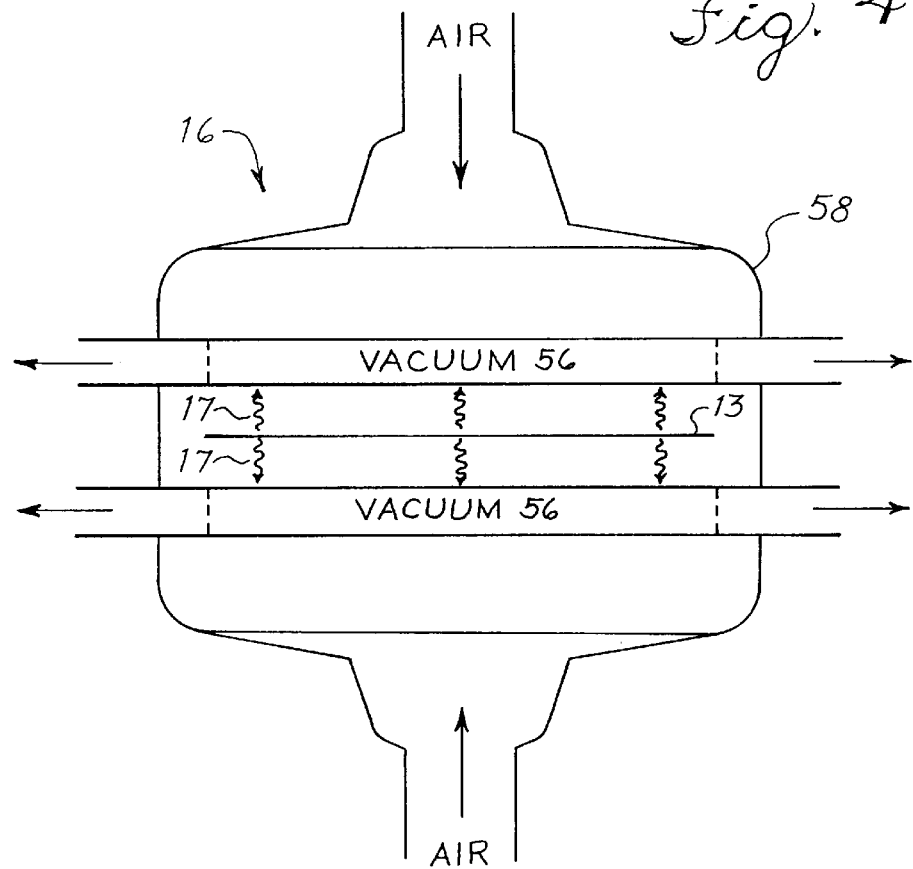
FIG. 4 is a cross-sectional longitudinal view of the vacuum unit of the cleaning process.

Vacuum: A high pressure vacuum unit 16 and 20 is used to suck particles off the web. As shown in FIG. 4, the vacuum 56 is applied to draw air 17 from just above and below the web 13 in an enclosure 58 with a filtered air supply. This enclosure is necessary for three reasons: first, the air pressure differential needed to support a clean room should not be disturbed by the vacuum; second, it is preferable to draw air in a controlled direction to the object you wish to clean; and third, you gain a high degree of control over the vacuum force on the web by controlling the rate of air introduction and dissipation in the enclosure. Such vacuum units are commercially available from Web Systems, Boulder, Colo., Model "ULTRA".

Preferably, the equipment on the cleaning process includes units for carrying out all these cleaning operations. But all units do not need to operate continuously, depending on the particulate levels of the raw materials. As a minimum, when using fairly clean raw webs, the cleaning process should be operated with the anti-static units, vacuum units and ultrasonic units in operation. Should the webs be dirtier and the product not be sufficiently cleaned, it is preferred to next put the high pressure air blowing units into operation. Finally, should the webs need additional cleaning to meet specification, the immersion units should be put into operation.

Sealing Process

Figure 2:
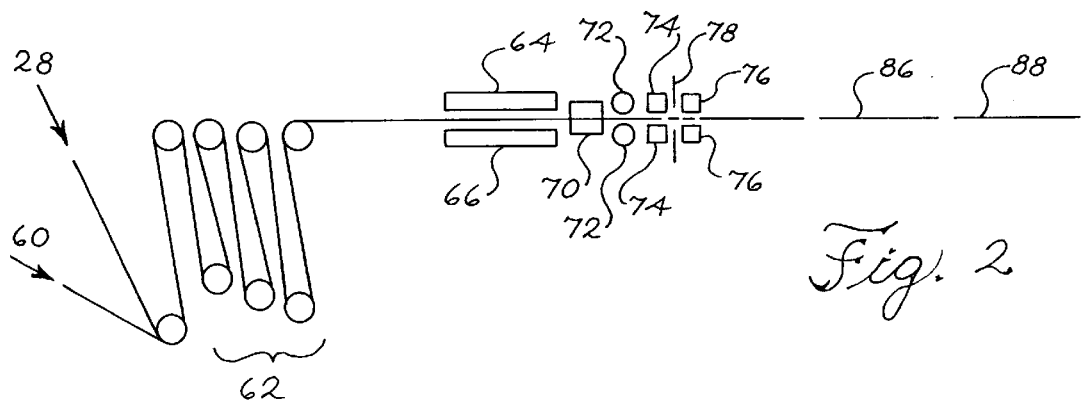
FIG. 2 is a lateral schematic view of the heat sealing process of the present invention.

After the webs pass through the cleaning process, they are fed to the sealing process. The sealing process is important to structural integrity of the bags. The sealing process is shown in FIGS. 2 and 3. In the sealing process, the two webs 28 and 60 are drawn from their respective cleaning processes. The two webs with the preferred materials TYVEK on top and PRECISION CLEAN HD on bottom, are passed through a series of tension rollers 62 to take up slack and draw the webs in a continuous basis, even though the sealing and cutting units operate intermittently. The two webs join together to form a two-layer web.

The combined two-layer web passes, first, to the first longitudinally aligned sealing units 64 and 66 where the bottom seam 68 of the bag is heat welded. The web then passes through anti-static device 70 and rollers 72. After this, the web passes to the second transversely aligned sealing units 74 and 76 with a knife 78 between the two sealing units. The sealing units 74 and 76 apply the leading side seam 80 and trailing side seam 82, respectively, to the thereby formed pouches. The knife 78 makes a slice 84 between seams 80 and 82 to separate the pouches into individual bags 86 and 88. The individual bags are collected and packaged into a cleaned polybag.

The heat sealing units 64, 66, 74 and 76 are standard commercially available "twin seal" machines from Amplas, Inc., of Green Bay, Wis. However, in order to attain the unique heat welded seals of this invention, these sealing units are modified. One important modification is that no heat is applied from the upper platen against the TYVEK. Only pressure, on the order of 20–40 psi, is applied from the upper platen. The bottom platen also applies a similar opposing pressure. But, only the bottom platen applies heat to the HDPE web, which in combination with other factors creates the strong seals. Another modification has been made to the heat sealing units. The bottom platen has been modified so that the top of the heating wire is at about the same height as the pressure pad. Normally, the heating wire sits on top of the pad. Here, a groove was made in the pressure pad with a depth about the thickness of the heating wire. The wire was placed in this groove. Through extensive process testing, it was found that this modification allowed the creation of stronger, substantially pinhole free seals, and significantly reduced process variability. In addition, after testing numerous types of heat wire available commercially, it was found that AMPLAS Nichrome wire, Part No. 003-778, allowed the creation of more consistent, stronger and substantially pinhole free heat seals.

Pinhole free seals describe the condition where substantially no holes or tears or large pores are formed, on or near the seals, that are substantially greater in size than the pores normally found in the spun-bonded polyolefin web material. Typically, pore sizes in medical grade TYVEK are too small for visual inspection. Therefore, substantially pinhole free seals may be confirmed by FDA approved bacteriological studies, for example, among other methods.

A seal free of pinholes, and a strength more than 5 pounds per linear inch have been attained with the method of this invention. This level of strength in a substantially pinhole free TYVEK/polyolefin structure is unique in a heat seal. The heat seal technology used is a modified version of impulse seal technology available in the market. After numerous studies of heat sealed TYVEK, it was determined that the weakest point of a TYVEK seal is at the edge of where heat and pressure are applied to the material causing a sudden drop in gauge. TYVEK typically varies between 4 and 10 mils thick, but is compressed to between 1 and 2 mils at the heat weld seam.

To ensure that seal integrity is excellent along these edges, it is necessary to melt and flow the HDPE web into the TYVEK. allowing the bottom portion of the TYVEK to bond without being totally compressed and melted. Heat and pressure are applied only against the HDPE side of the structure, causing it to melt and flow into the porous TYVEK layer. The amount of pressure and heat applied varies depending on the temperature in the process work area, the speed at which the equipment is operating and the thickness of the HDPE. The application of heat generally is in the range of 300–380° F., preferably, 330–350° F., for a period of 0.15–0.7 seconds followed by a cooling period under pressure of 0.4–1.0 seconds. The application of pressure is between about 20 to 40 psi. These ranges are preferred for operating between 25 to 60 heat sealing cycles per minute through the equipment. The times and temperatures should be varied depending on the number of cycles. By running two bags in parallel of a double wide web, the production can be doubled without changing the number of heat sealing cycles per minute.

Under these conditions, a bag may be made having a variety of dimensions and varying seal widths. Typically, the bags are between 3 and 60 inches wide and 3 and 60 inches long, depending on the needs of the customer. The seals can vary in width between ⅛ inch and ¾ inch. Commonly, the bags have a seal width of ⅛ inch.

EXAMPLE 1

By way of example, twenty bags were pulled at random for testing. These twenty bags were made of the preferred raw materials, TYVEK 1059B and Precision Clean™ HDPE. The bags had a width of 12 inches and a length of 18 inches and were designed to carry a load of about 15 pounds of pharmaceutical container components that will undergo steam sterilization under the following conditions: (1) a wrap goods cycle of 15 minutes total with three air removals at −28.3 inches Hg; (2) an expose cycle at 121° C. for 45 minutes total ±2° C.; and (3) a post conditioning cycle for 30 minutes total at minus 30 inches Hg, starting at 110° C. and ending at 50° C., The seals were made under the following conditions: Bottom seal: pressure—30 psi, temperature—330° F., seal time—0.3 seconds, and cooling time—0.7 seconds. Leading side seal: pressure—40 psi, temperature—330° F., seal time—0.3 seconds, and cooling time—0.7 seconds. Trailing side seal: pressure—30 psi, temperature—330° F., seal time—0.3 seconds, and cooling time—0.7 seconds.

The twenty bags made under these conditions had substantially pinhole free seals. The seal strength was tested according to ASTM-F88-85 conforming to the requirements of test method ASTM-D882. The range of seal strengths measured for these bags showed a near normal distribution of pull strengths between 9.01 and 10.50 pounds per linear inch. This is sufficiently strong so that in practical use the TYVEK material will tear apart before the seals come apart.

TABLE 1

| Sample No. | Pull strength (lbs./linear in.) |
| --- | --- |
| 1 | 9.01 |
| 2 | 9.02 |
| 3 | 10.46 |
| 4 | 9.86 |
| 5 | 9.12 |
| 6 | 9.48 |
| 7 | 9.75 |
| 8 | 9.03 |
| 9 | 10.50 |
| 10 | 9.56 |
| 11 | 9.64 |
| 12 | 9.86 |
| 13 | 9.93 |
| 14 | 9.05 |
| 15 | 9.02 |
| 16 | 9.65 |

TABLE 1-continued

| Sample No. | Pull strength (lbs./linear in.) |
| --- | --- |
| 17 | 9.50 |
| 18 | 9.58 |
| 19 | 9.02 |
| 20 | 9.72 |
| Average | 9.53 |

EXAMPLE 2

In another batch of randomly taken sterilizable bags with the same materials and heat sealing process as described for Example 1, the webs were sent through the following cleaning process as shown and described in FIG. 1 with all of the shown cleaning units in operation. The bags were tested to determine the particulate counts in the following manner.

In a Class M3.5 clean work environment, a clean 500 ml flask was filled with 0.2 micron filtered water. Then a particulate count was conducted on the water to determine the background count. A sample bag was taken and 100 ml of water poured into the bag. The end of the bag was heat weld sealed using an impulse sealer. The bag was inverted 30 times so that the water washed both sides of the bag. The bag was cut open and the water poured into a clean beaker. The beaker was taken to a laser liquid particle counter, model 4100, manufactured by HIAC-ROYCO, of Silver Springs, Md., and the particulate count broken down by 2 microns, 5 microns, 10 microns, 15 microns, 25 microns and 50 microns. The counts for 50 bags taken at random were consolidated and summarized as follows (units are average particles per square foot of inner surface area of the bag):

2 microns—1917.84; 5 microns—208; 10 microns—128, 15 microns—82.75; 25 microns—24.25; and, 50 microns—0.5

Typically, these bags of Examples 1 and 2 would be used for pharmaceutical intermediate processing. For example, these bags would be loaded with 1200 rubber stoppers having a total weight of 15 pounds. The open edge of the bag would be sealed by any standard impulse heat sealing machine that is modified to seal the bag without creating tears or pinholes in the TYVEK in accordance with this invention as described above. Then, the bag would be placed in a sterilizing unit, such as an ETO gas sterilization, for example, or a steam autoclave operating at 121° C. for 30 minutes, as described above, or other standard FDA sterilization cycle. Following sterilization, the loaded bags could be placed on an inventory storage and maintain the contents in sterile condition indefinitely. However, most users will consume the articles within three months.

The pharmaceutical processor would retrieve the bag from storage when needed. An operator would take the bag into the clean room environment, and then cut open the bag with a knife or scissors to avoid creating loose fibers from tearing or shredding the TYVEK. Depending on the level of cleanliness required, some articles may be double-bagged. In this case, the outer bag would be removed prior to entering the clean room to avoid bringing in contaminants on the outer surface of the bag. An advantage of this preferred embodiment of the bag is that one full side is made with permeable TYVEK so there is minimal resistance to sterilization gasses. Even double bagged articles may be sent through a sterilization cycle with little extra resistance to the infusion of the sterilizing gasses. Another advantage is that the opposing side of the bag is a transparent HDPE film that permits visual inspection of the contents.

It should be appreciated that the methods and apparatus of the present invention are capable of being incorporated in the form of a variety of embodiments, only a few of which have been illustrated and described above. The invention may be embodied in other forms without departing from its spirit or essential characteristics.

For example, the receptacle may be made in a shape other than a square bag. The two layers need not be the exact same size. The HDPE side could be larger at one end with a lip that is to be folded over for sealing with the TYVEK. An adhesive could be applied to the lip to provide for a peelable, resealable opening in the bag. A bag of this type will have the cleanliness features of the invention, but will be lacking the strong seal strength to withstand large differential pressures during the steam sterilization cycles. Nevertheless, with three side seals made according to the invention, the bag has durable seals against heavy content loads when kept in an upright position, a feature that is also advantageous for users in intermediate processing.

Likewise, the pouches need not be cut into individual bags after the seams are made. Instead of slicing between the leading and trailing seams, a perforation could be made that would allow the bags to be torn off a roll as needed. To avoid tearing the TYVEK, it could be pre-cut as the HDPE is perforated underneath.

Similarly, rolls of two-layer tubing can be made following the process of this invention. The user of the tubing would slice off the exact length needed, apply a bottom seam to form a pouch, load articles into the pouch and then apply the top seam in accordance with the teachings herein.

Other features may be incorporated into the bag. For example, sterilization indicators and patches could be printed on or attached to one of the layers.

In addition, this method for creating seams with superior strength according to this invention can be applied to markets other than pharmaceutical intermediate processing. For example, in the agricultural industry, breathable receptacles with strong seams may be valuable for growing and storing mushrooms. Of course, for such an application, the cleanliness of the receptacle is not a requirement. But, the durability of the seams may be an important factor in the selection of receptacles for use where the material handling methods are rough.

The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed is:

1. A method for making a non-peelable sterilizable receptacle having a low particulate count for receiving articles for storage in pharmaceutical intermediate processing, the method comprising:
   providing a continuous first web of polyolefin film;
   providing a continuous second porous web of spun-bonded polyolefin, the second web having a melting point about the same as the melting point of the first web;
   advancing said first web through a first cleaning processes including an anti-static device, an ultrasonic device and a vacuum device;
   advancing said second web through a second cleaning processes including an anti-static device, an ultrasonic device and a vacuum device;
   bringing together said second web and said first web;
   heat welding the first web to the second web to form continuous seams on the webs to form an open pouch by applying pressure against the first and second webs and by applying only against the first web sufficient heat to melt at least the first web, wherein said seams are substantially pinhole free and have a pull resistance greater than 5 pounds per linear inch; and
   cutting the welded webs proximate to one of said seams to form the receptacle.

2. The method of claim 1 wherein at least one of the cleaning processes further includes a high pressure air blowing unit.

3. The method of claim 2 wherein at least one of the cleaning processes further includes an immersion unit and a high speed filtered heated air drying zone.

4. The method of claim 3 wherein the second web is advanced through the anti-static device, then the immersion unit and the high speed filtered heated air drying zone, then the ultrasonic device and the vacuum device, and then the high pressure air blowing unit.

5. The method of claim 3 wherein the first and second cleaning processes are sufficient to reduce a particulate count of the receptacle to less than 60 particles greater than 25 microns per square foot of surface area.

6. The method of claim 1 wherein the first web is high density polyethylene and the second web is spun-bonded polyethylene.

7. The method of claim 1 wherein the pressure is between about 20 and about 40 psi, and the heat is at a temperature between about 330° F. and about 380° F.

8. The method of claim 1 wherein the heat is provided by a heating wire positioned in a pressure pad such that the top of the heating wire is at about the same level as the surface of the pressure pad.

9. A method for making a non-peelable sterilizable receptacles having a low particulate count for receiving articles for storage in pharmaceutical intermediate processing, the method comprising:
   providing a continuous first web of high density polyethylene that has been cleaned to obtain a reduced particulate count;
   providing a continuous second porous web of spun-bonded polyethylene that has been cleaned to obtain a reduced particulate count;
   bringing said webs together forming a dual layer web;
   creating a longitudinal weld seam by intermittently applying about 20–40 psi pressure on opposite sides of the dual layer web with opposing platen heads to squeeze the webs together, and applying only to the high density polyethylene web a heat sealing element at a temperature about 300–380° F. for about 0.15–0.7 seconds followed by a cooling period of about 0.4–1.0 seconds;
   creating a transverse weld seam by intermittently applying about 20–40 psi pressure on opposite sides of the dual layer web with opposing platen heads to squeeze the webs together, and applying only to the high density polyethylene web a heat sealing element at a temperature about 300–380° F. for about 0.15–0.7 seconds followed by a cooling period of about 0.4–1.0 seconds; and
   cutting intermittently through the welded dual layer web to form the receptacles.

10. The method of claim 9 wherein the pressure on the transverse weld seam platen is about 30 psi, and the heat is at a temperature between about 330° F. and about 350° F. for about 0.3 seconds with a cooling time of about 0.7 seconds, and the pressure on the longitudinal weld seam platens is about 30 to 40 psi, and the heat is at a temperature between about 330° F. and about 350° F. for about 0.3 seconds with a cooling time of about 0.7 seconds.

11. The method of claim 9 wherein the receptacles are formed in a Class M2.5 or cleaner environment.

12. The method of claim 9 wherein said heat sealing elements are positioned in a pressure pad such that the top of the heat sealing elements are at about the same level as the surface of the pressure pad.

13. The method of claim 9 wherein said weld seams are substantially pinhole free and have a pull resistance greater than 5 pounds per linear inch.

14. The method of claim 9 wherein the first and second webs have a particulate count of less than 60 particles greater than 25 microns per square foot of surface area.

15. A method for making a non-peelable sterilizable receptacle having a low particulate count for receiving articles for storage in pharmaceutical intermediate processing, the method comprising:

providing a continuous first web of polyolefin film having a particulate count of to less than 60 particles greater than 25 microns per square foot of surface area;

providing a continuous second porous web of spun-bonded polyolefin, the second web having a melting point about the same as the melting point of the first web and a particulate count of less than 60 particles greater than 25 microns per square foot of surface area;

bringing together said second web and said first web;

heat welding the first web to the second web to form continuous seams on the webs to form an open pouch by applying pressure against the first and second webs and by apply only against the first web sufficient heat to melt at least the first web, wherein said seams are substantially pinhole free and have a pull resistance greater than 5 pounds per linear inch; and cutting the welded webs proximate to one of said seams to form the receptacle.

16. The method of claim 15 wherein the first web is high density polyethylene and the second web is spun-bonded polyethylene.

17. The method of claim 15 wherein the pressure is between about 20 and about 40 psi, and the heat welding is at a temperature between about 330° F. and about 380° F.

18. The method of claim 17 wherein heat for the heat welding is provided by a heating wire positioned in a pressure pad such that the top of the heating wire is at about the same level as the surface of the pressure pad.

* * * * *

UNITED STATES PATENT AND TRADEMARK OFFICE
CERTIFICATE OF CORRECTION

PATENT NO. : 5,976,299
DATED : November 2, 1999
INVENTOR(S) : Brian W. Ivey

It is certified that error appears in the above-identified patent and that said Letters Patent is hereby corrected as shown below:

<u>In the Claims</u>

In claim 9, line 1, delete "making a" and substitute --making-- in its place.

In claim 15, line 6, delete "of to less" and substitute --of less-- in its place.

In claim 15, line 17, delete "apply" and substitute --applying-- in its place.

Signed and Sealed this

Eighth Day of May, 2001

*Attest:*

NICHOLAS P. GODICI

*Attesting Officer*     *Acting Director of the United States Patent and Trademark Office*